(12) United States Patent
Park et al.

(10) Patent No.: US 11,178,692 B2
(45) Date of Patent: Nov. 16, 2021

(54) METHOD FOR TRANSMITTING/RECEIVING UPLINK CONTROL INFORMATION AND DEVICE SUPPORTING SAME IN WIRELESS COMMUNICATION SYSTEM SUPPORTING UNLICENSED BAND

(71) Applicant: LG ELECTRONICS INC., Seoul (KR)

(72) Inventors: Hanjun Park, Seoul (KR); Joonkui Ahn, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 642 days.

(21) Appl. No.: 16/071,246

(22) PCT Filed: Jan. 26, 2017

(86) PCT No.: PCT/KR2017/000961
§ 371 (c)(1),
(2) Date: Jul. 19, 2018

(87) PCT Pub. No.: WO2017/131471
PCT Pub. Date: Aug. 3, 2017

(65) Prior Publication Data
US 2021/0144763 A1 May 13, 2021

Related U.S. Application Data

(60) Provisional application No. 62/288,451, filed on Jan. 29, 2016.

(51) Int. Cl.
*H04W 74/08* (2009.01)
*H04L 1/00* (2006.01)
(Continued)

(52) U.S. Cl.
CPC ....... *H04W 74/0816* (2013.01); *H04L 1/0013* (2013.01); *H04L 5/0053* (2013.01);
(Continued)

(58) Field of Classification Search
CPC ......... H04W 74/0816; H04W 72/0413; H04W 72/0446; H04W 72/1215; H04W 74/004; H04L 1/0013; H04L 5/0053
See application file for complete search history.

(56) References Cited

U.S. PATENT DOCUMENTS

2017/0289995 A1* 10/2017 Lin .................... H04W 72/12
2017/0290008 A1* 10/2017 Tooher ................ H04L 1/1893

FOREIGN PATENT DOCUMENTS

WO   WO 2013/027967 A2    2/2013
WO   WO 2015/167222 A1   11/2015

OTHER PUBLICATIONS

Huawei et al, "Views on TTI length", R1-156459, 3GPP TSG RAN WG1 Meeting #83, Anaheim, USA, Nov. 15-22, 2015, 5 pages.
(Continued)

*Primary Examiner* — Duc C Ho
(74) *Attorney, Agent, or Firm* — Birch, Stewart, Kolasch & Birch, LLP

(57) ABSTRACT

Disclosed are a method for transmitting/receiving uplink control information between a terminal and a base station and a device supporting same in a licensed assisted access (LAA) system in which the base station or the terminal executes listen-before-talk (LBT)-based signal transmission. Specifically, disclosed are: a method for a terminal efficiently transmitting uplink control information to a base station when the terminal transmits the uplink control information to a transmission time interval (TTI) that is shorter than the length of one subframe; and a device supporting same.

11 Claims, 18 Drawing Sheets

(51) Int. Cl.
*H04L 5/00* (2006.01)
*H04W 72/04* (2009.01)
*H04W 72/12* (2009.01)
*H04W 74/00* (2009.01)

(52) U.S. Cl.
CPC ... *H04W 72/0413* (2013.01); *H04W 72/0446* (2013.01); *H04W 72/1215* (2013.01); *H04W 74/004* (2013.01)

(56) References Cited

OTHER PUBLICATIONS

Intel Corporation, "Discussion on TTI Shortening", R1-156540, 3GPP TSG RAN WG1 Meeting #83, Anaheim, USA, Nov. 15-22, 2015, 4 pages.
Samsung, "Study on specification impact for uplink due to TTI shortening", R1-156822, 3GPP TSG RAN WG1 #83, Anaheim, USA, Nov. 15-22, 2015, 3 pages.

\* cited by examiner

- PRIOR ART -

- PRIOR ART -

(a)

(b)

- PRIOR ART -

METHOD FOR TRANSMITTING/RECEIVING UPLINK CONTROL INFORMATION AND DEVICE SUPPORTING SAME IN WIRELESS COMMUNICATION SYSTEM SUPPORTING UNLICENSED BAND

CROSS REFERENCE TO RELATED APPLICATIONS

This application is the National Phase of PCT/KR2017/000961 filed on Jan. 26, 2017, which claims priority under 35 U.S.C. § 119(e) to U.S. Provisional Application No. 62/288,451 filed on Jan. 29, 2016, all of which are hereby expressly incorporated by reference into the present application.

TECHNICAL FIELD

Following description relates to a wireless communication system supporting an unlicensed band, and more particularly, to a method of transmitting and receiving uplink control information between a user equipment and a base station in a wireless communication system supporting an unlicensed band and apparatuses supporting the method.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

When a base station or a UE performs LBT (listen-before-talk)-based signal transmission, an object of the present invention is to provide a method of transceiving uplink control information between the UE and the base station.

In particular, when a UE transmits uplink control information with a TTI (transmission time interval) shorter than a length of a single subframe, an object of the present invention is to provide a method for the UE to efficiently transmit the uplink control information to a base station.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention proposes a method of transmitting and receiving uplink control information between a user equipment and a base station in a wireless communication system supporting an unlicensed band and apparatuses supporting the method.

To achieve these and other advantages and in accordance with the purpose of the present invention, as embodied and broadly described, according to one embodiment, a method of transmitting uplink control information, which is transmitted by a user equipment (UE) to a base station in a wireless communication system supporting an unlicensed band, includes configuring (or setting) a PUCCH (physical uplink control channel) format which is applied according to a TTI (transmission time interval) length by the base station, and transmitting the uplink control information in a subframe in which the uplink control information is to be transmitted using a PUCCH format which is configured according to a TTI length applied to the subframe.

To further achieve these and other advantages and in accordance with the purpose of the present invention, according to a different embodiment, a user equipment (UE) transmitting uplink control information to a base station in a wireless communication system supporting an unlicensed band includes a receiver, a transmitter, and a processor configured to operate in a manner of being connected with the receiver and the transmitter, the processor configured to configure (or set) a PUCCH (physical uplink control channel) format which is applied according to a TTI (transmission time interval) length by the base station, the processor configured to transmit the uplink control information in a subframe in which the uplink control information is to be transmitted using a PUCCH format which is configured according to a TTI length applied to the subframe.

In this case, the configuring the PUCCH format which is applied according to the TTI length by the base station corresponds to receiving information on the PUCCH format which is applied according to the TTI length from the base station.

And, a first PUCCH format is configured to a first subframe of which a TTI length corresponds to a length of one subframe and a second PUCCH format can be configured to a second subframe of which a TTI length is shorter than a length of one subframe.

For example, the first PUCCH format corresponds to a PUCCH format 1 and the second PUCCH format may correspond to a PUCCH format 4 to which rate-matching or puncturing is applied.

As a different example, the first PUCCH format corresponds to a PUCCH format 1/1a/1b/3 and the second PUCCH format may correspond to a shortened PUCCH format 1/1a/1b/3 to which an OCC (orthogonal cover code) corresponding to a TTI length is applied.

As a further different example, the first PUCCH format corresponds to a PUCCH format 2/4/5 and the second PUCCH format may correspond to a PUCCH format 2/4/5 to which rate-matching or puncturing is applied.

In this case, the uplink control information can include at least one selected from the group consisting of ACK/NACK (acknowledgement/non-Acknowledgement) information, RI (Rank indicator) information, and CQI (channel quality indicator) information.

The uplink control information can be transmitted via an unlicensed band.

To further achieve these and other advantages and in accordance with the purpose of the present invention, according to a further different embodiment, a method of receiving uplink control information, which is received by a base station from a user equipment (UE) in a wireless communication system supporting an unlicensed band includes configuring (or setting) a PUCCH (physical uplink control channel) format, which is applied according to a TTI (transmission time interval) length, to the UE, and receiving the uplink control information from the UE in one or more subframes using a PUCCH format which is configured according to a TTI length applied to the one or more subframes.

To further achieve these and other advantages and in accordance with the purpose of the present invention, according to a further different embodiment, a base station receiving uplink control information from a user equipment (UE) in a wireless communication system supporting an unlicensed band includes a receiver, a transmitter, and a processor configured to operate in a manner of being connected with the receiver and the transmitter, the processor configured to configure (or set) a PUCCH (physical uplink control channel) format, which is applied according to a TTI (transmission time interval) length, to the UE, the processor configured to receive the uplink control information from the UE in one or more subframes using a PUCCH format which is configured according to a TTI length applied to the one or more subframes.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, if a UE transmits uplink control information with a TTI (transmission time interval) shorter than a length of a single subframe in a wireless access system supporting an unlicensed band, the UE can efficiently transmit the uplink control information.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Mode for Invention

Figure 1:
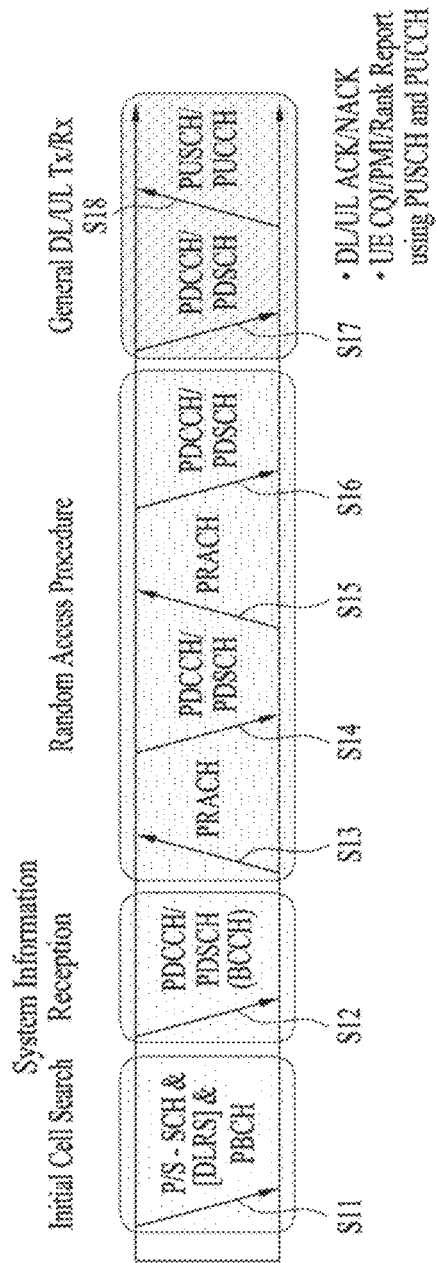
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term. TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
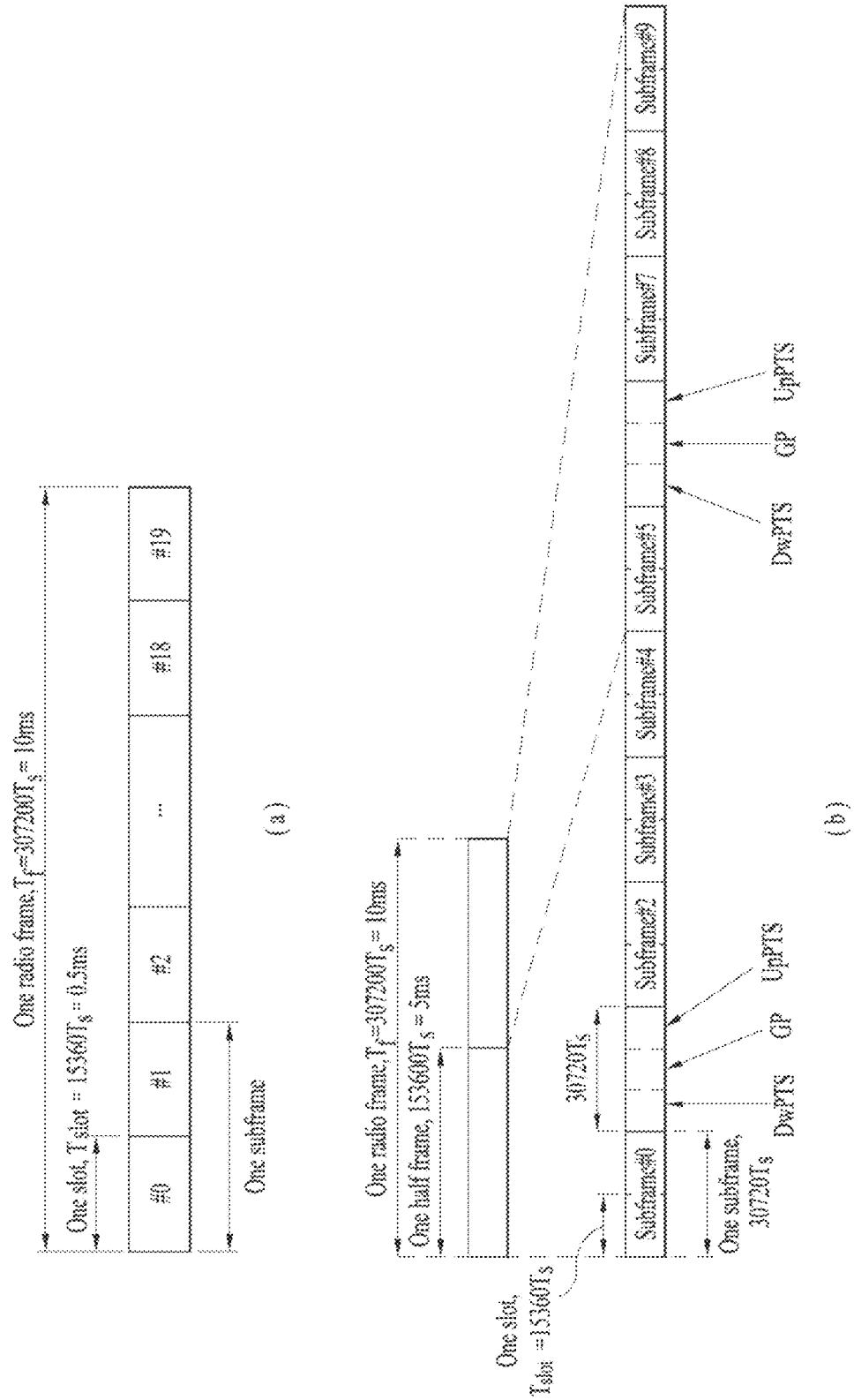
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
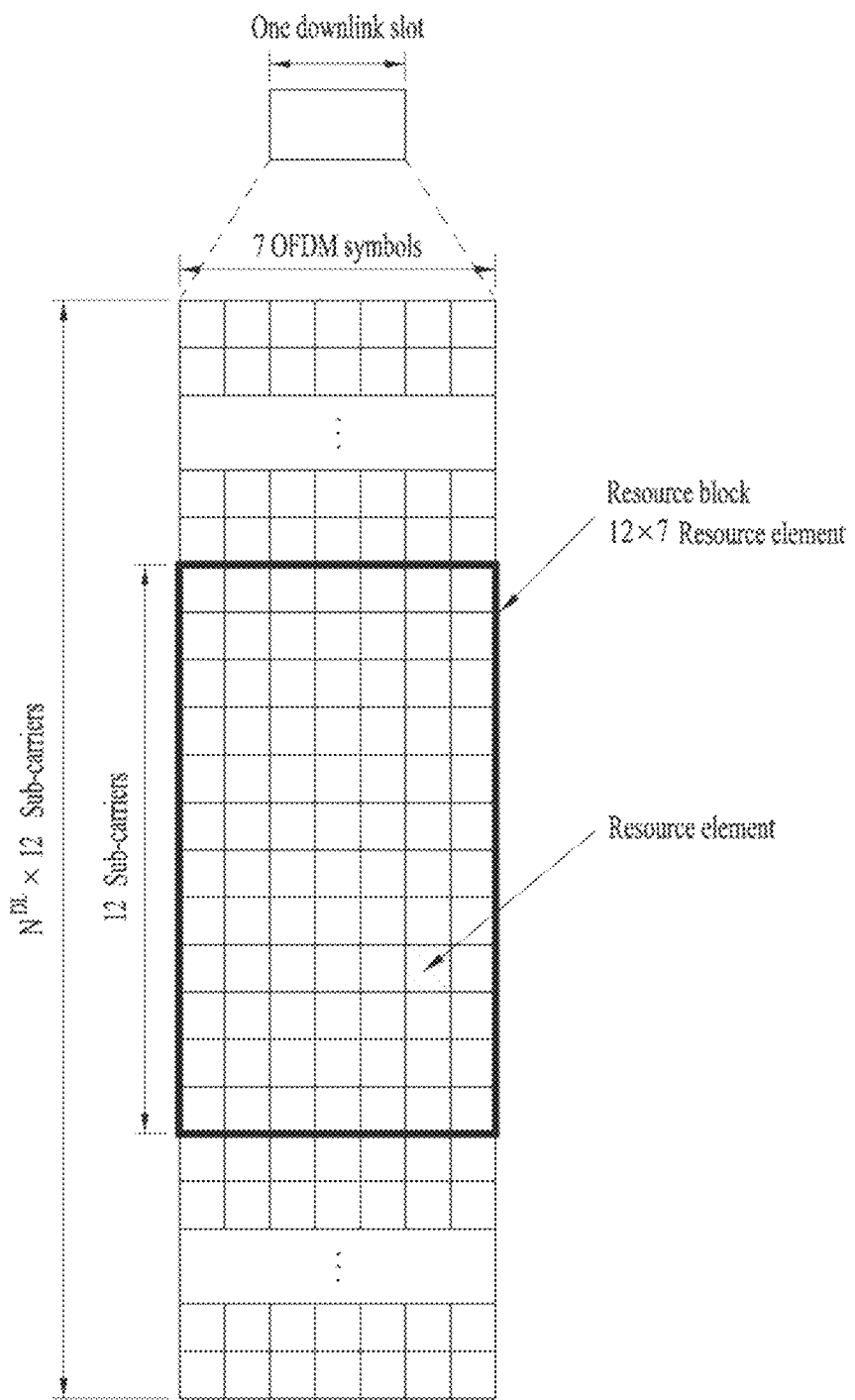
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
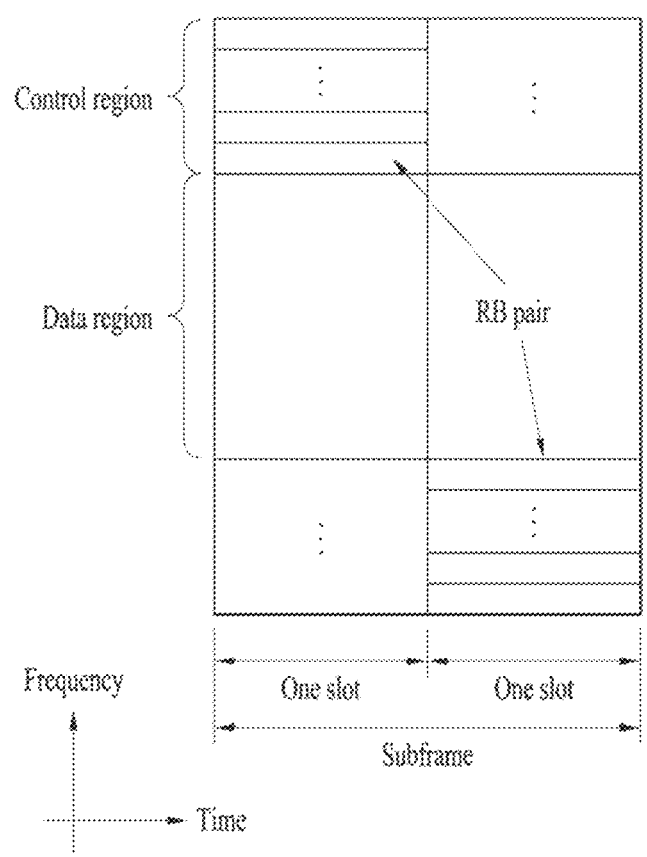
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
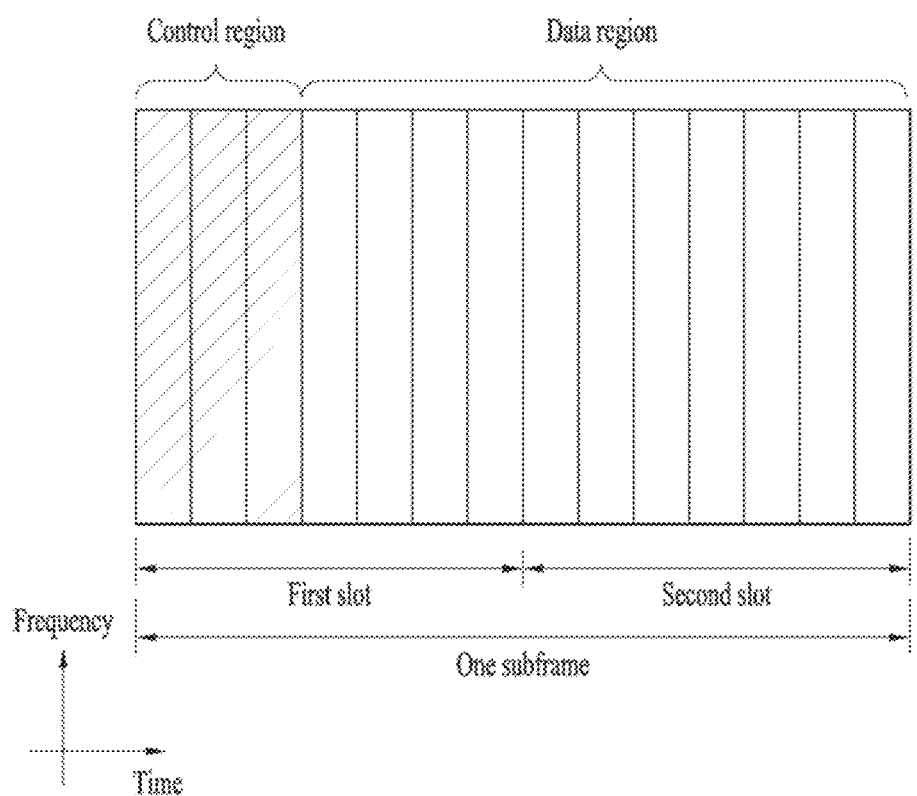
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System

2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
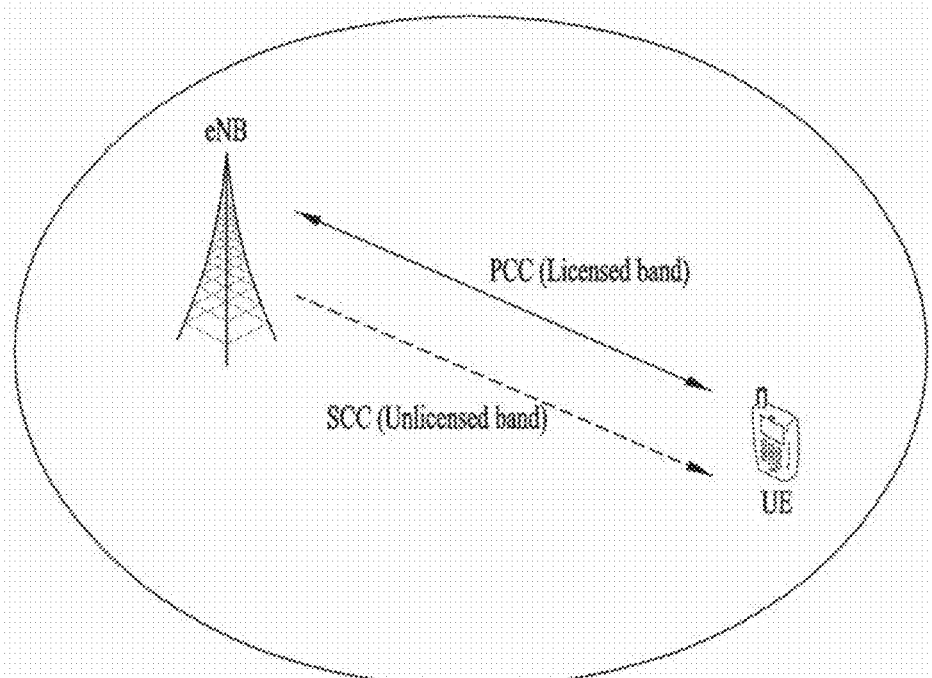
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
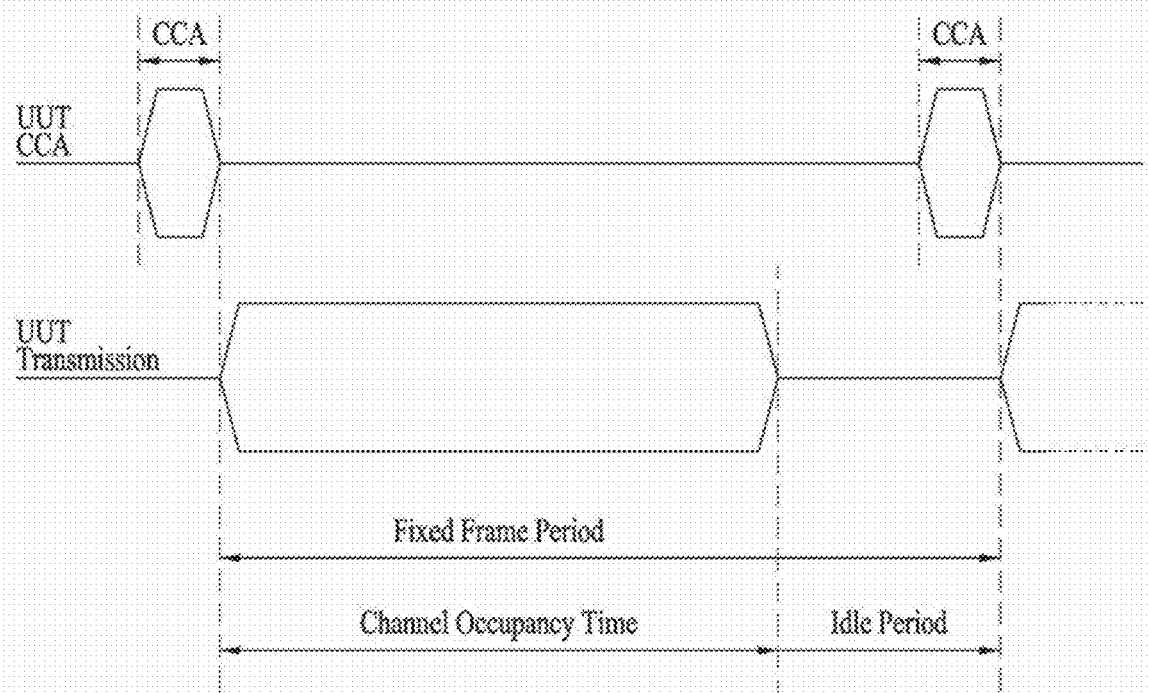
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
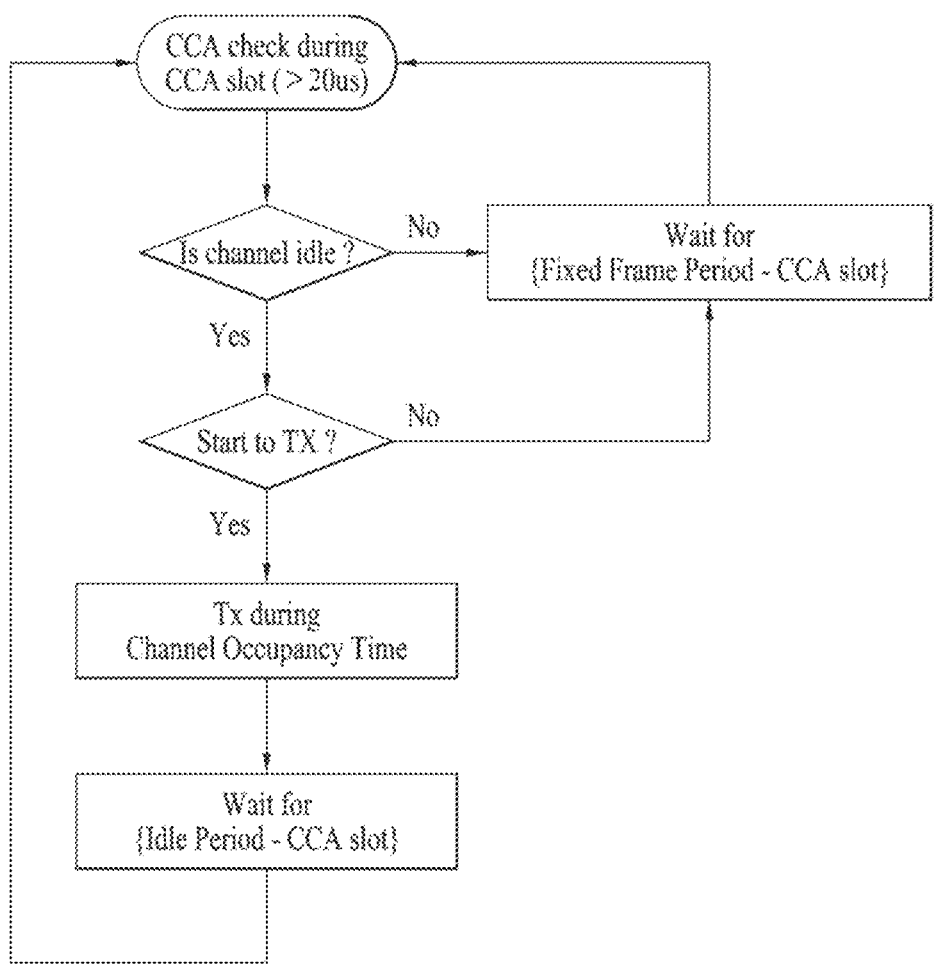
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 9:
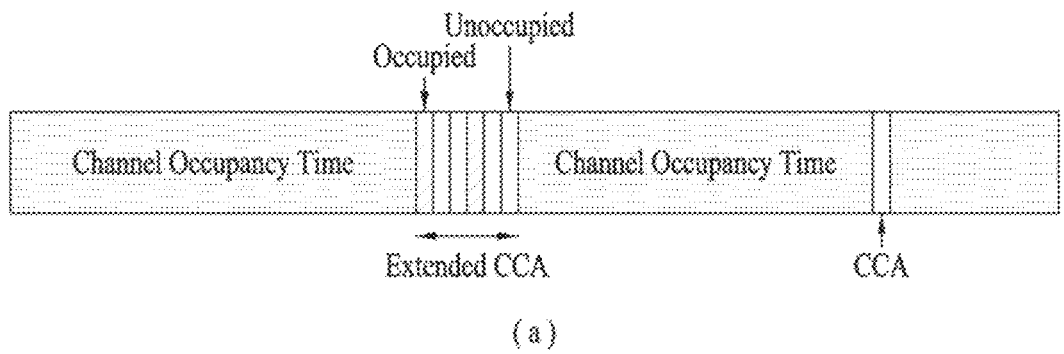
FIG. 9 is a diagram illustrating an exemplary Load Based Equipment (LBE) operation as one of the LBT operations.
Figure 9:
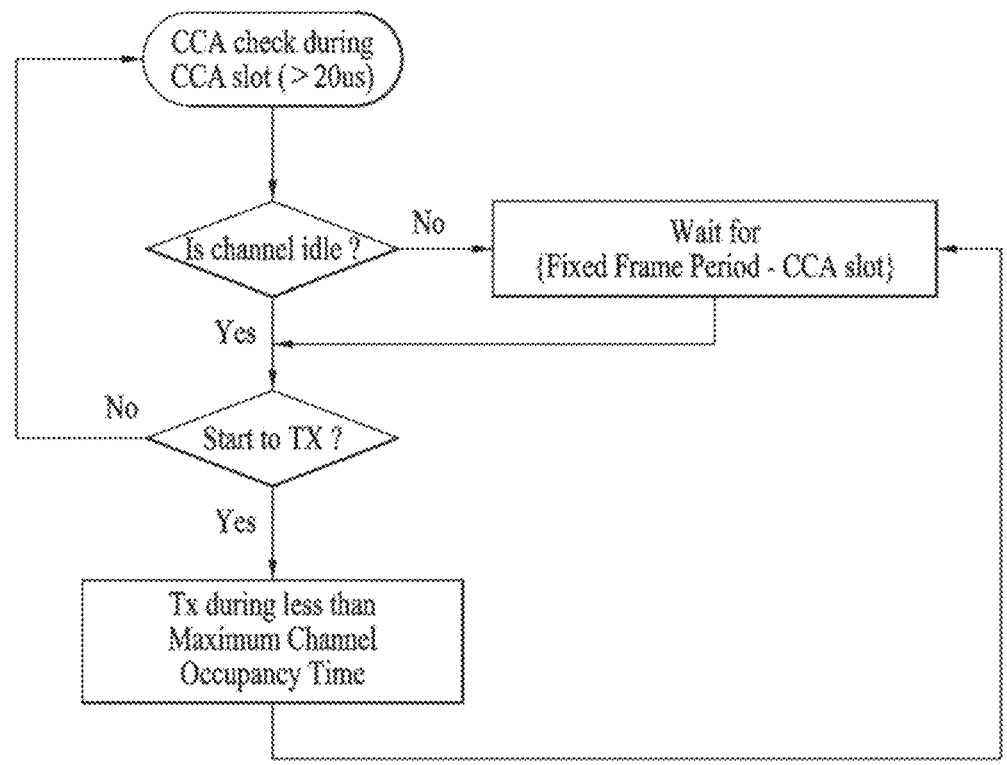

FIG. 9 is a view illustrating an exemplary LBE operation as one of the LBT operations.

Referring to FIG. 9(*a*), in LBE, the communication node first sets q (q ∈{4, 5, . . . , 32}) and then performs CCA during one CCA slot.

FIG. 9(*b*) is a block diagram illustrating the LBE operation. The LBE operation will be described with reference to FIG. 9(*b*).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
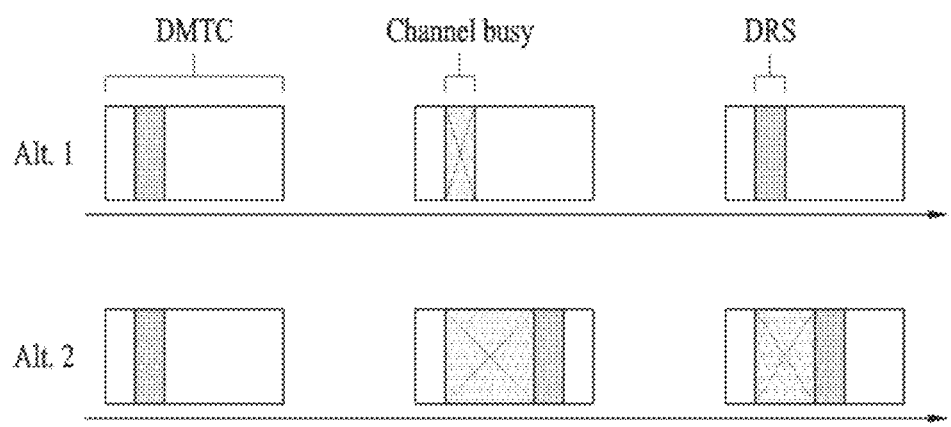
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
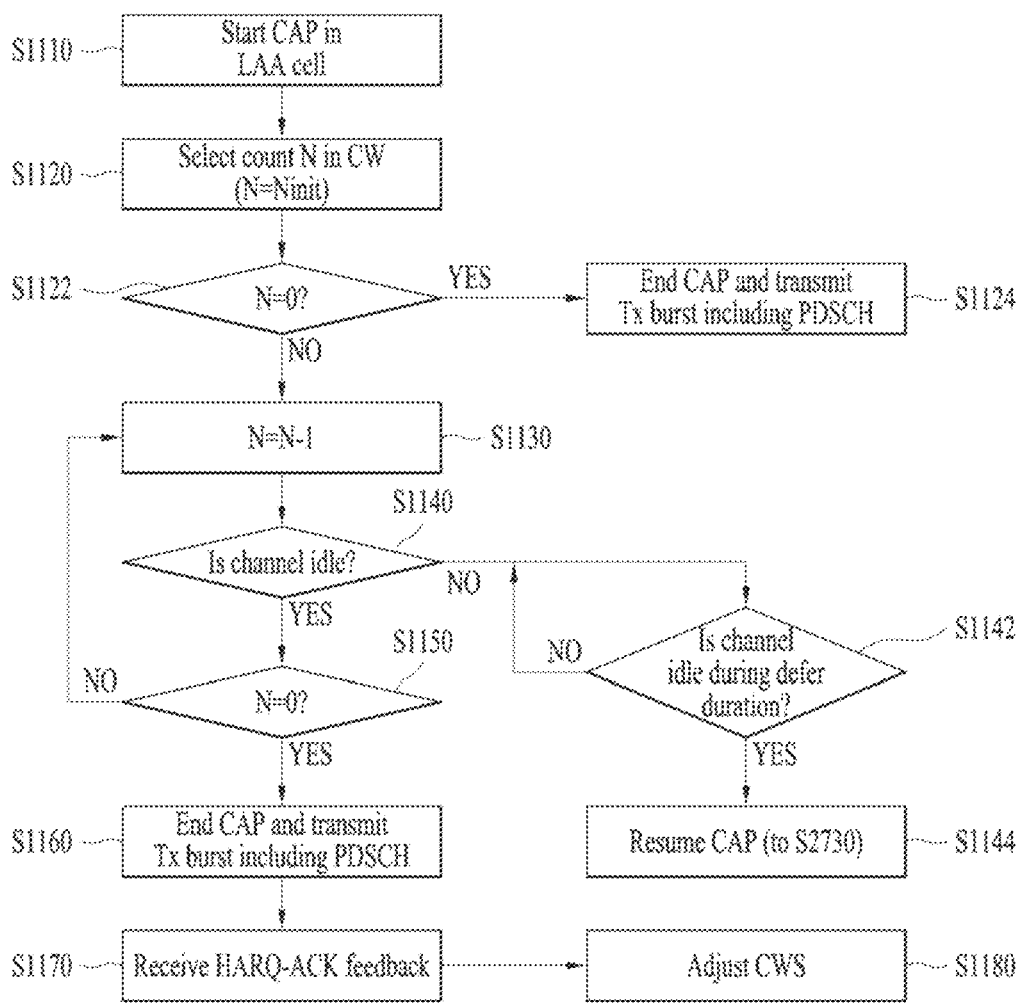
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255, 511,1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
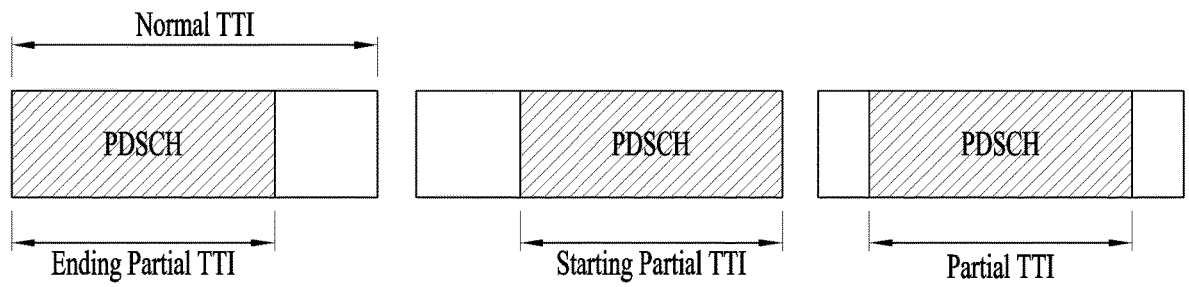
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

Meanwhile, LTE Release-14 system intends to support UL transmission in LAA. In this case, not only data but also UCI is considered as a target for performing the UL transmission. More specifically, in release-14 LAA system, it may consider an operation of transmitting PUCCH in a cell of an unlicensed band or an operation of piggybacking UCI with PUSCH. In particular, the present invention proposes a method of performing UL LBT in consideration of the importance of UCI and a method of transmitting PUCCH or PUSCH with which UCI is piggybacked via a cell of an unlicensed band (U-cell) in consideration of a UL partial TTI.

3.1 LBT Operation Change According to UCI Transmission 3.1.1 Method 1

A UE performs an independent UL LBT operation according to whether or not UCI (uplink control information) is transmitted. In particular, the UE can apply the independent UL LBT operation to the following cases.

(1) In case of transmitting UCI only (UCI only) (e.g., PUCCH transmission or UCI only and transmission via PUSCH)

(2) In case of transmitting data

In particular, when UCI only transmission is performed, the UE can apply a UL LBT operation (hereinafter, fast UL LBT operation) more advantageous for accessing a channel compared to a UL LBT operation for transmitting data as a UL LBT operation as follows.

1) (In case of UCI only transmission), a relatively small range of a CWS value is configured.

2) (In case of UCI only transmission), a high energy detection threshold is configured.

3) (In case of UCI only transmission), CCA is configured to be performed on one CCA slot only as an LBT operation.

In this case, if the UE succeeds in accessing a channel using the fast UL LBT, a length of MCOT can be configured to be shorter than normal UL LBT.

As mentioned in the foregoing description, the UE can perform category-4 LBT operation to coexist with a different RAT (radio access technology) within an unlicensed band. In this case, among DL signals transmitted in LAA system, since a DRS (discovery reference signal) corresponds to a signal for performing synchronization and RRM (radio resource management), the DRS is important. Hence, it may exceptionally apply an LBT operation, which performs CCA on one CCA slot only, to the DRS instead of the category-4 LBT. In the same manner, when UL transmission is performed, in order to transmit UCI of which importance is high, it may consider the fast UL LBT operation which is more advantageous compared to the category-4 LBT.

Figure 13:
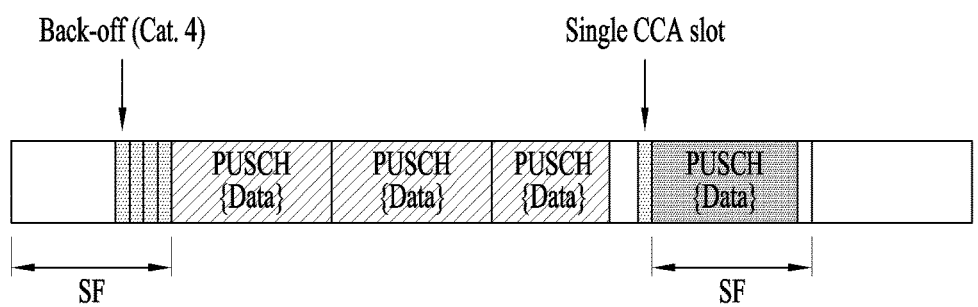
FIG. 13 is a diagram illustrating a fast UL LBT operation performing CCA on a single CCA slot only in case of UCI only transmission.

FIG. 13 is a diagram illustrating a fast UL LBT operation performing CCA only on a single CCA slot in case of UCI only transmission.

As shown in FIG. 13, a UE can perform a fast UL LBT operation performing CCA only on a single CCA slot to attempt to transmit PUCCH.

As a variation operation of the proposed method, the UE can be modified to perform the fast UL LBT operation, which is advantageous for channel access, on all cases of transmitting UCI. In particular, the UE can perform a UL LBT operation according to cases classified into two cases.

In case of transmitting UCI (e.g., transmission of PUCCH or transmission of PUSCH including UCI)

In case of transmitting data only

In this case, if PUSCH includes UCI and both the UCI and data are transmitted, the UE performs the fast UL LBT operation advantageous for accessing a channel in consideration of a problem of coexisting with a different RAT (e.g., Wi-Fi). In this case, it may set a limit on MCOT to make the MCOT have a value (e.g., MCOT 1 ms) smaller than MCOT of a UL LBT operation transmitting data only.

As a variation of the operation above, when a UE transmits PUSCH including UCI, if the UE performs a fast UL LBT operation on PUCCH, performs a normal UL LBT operation on the PUSCH, and succeeds in performing the fast UL LBT operation only, the UE can transmit the UCI only via PUCCH while PUSCH transmission is dropped.

Or, similar to ACK transmission of Wi-Fi corresponding to a different RAT of an unlicensed band, a UE transmits a reservation signal of a length equal to or shorter than a prescribed length after prescribed time (e.g., SIFS (short inter frame space) at the timing at which DL TX burst (or PDSCH received by the UE) ends and the UE can transmit ACK/NACK (or UCI). Or, as a different operation, when a UE transmits ACK/NACK (or UCI) within prescribed time from the timing at which DL TX burst ends, the UE can apply a fast UL LBT operation to transmit the ACK/NACK.

As an additional operation of the present invention, when a UE performs PUCCH transmission in an unlicensed band, a base station can inform the UE of PUCCH (or ACK/NACK) transmission timing (in response to PDSCH corresponding to a DL grant) via the DL grant in consideration of a flexible DL/UL structure.

3.2. PUCCH Structure Considering Partial TTI 3.2.1 Method 2

When a UE transmits a shortened PUCCH format (e.g., a form that a partial symbol is excluded from a PUCCH structure) for a PUCCH format (e.g., PUCCH format 1/1a/1b/3) to which a time axis OCC (orthogonal cover code) is applied in a UL subframe to which a partial TTI (or a TX gap) is applied, a base station or a UE may set a separate OCC to the shortened PUCCH format (according to a length of a partial TTI).

In this case, a separate OCC (to be applied to a shortened slot) can be set not only to an OCC for a region in which UCI is transmitted within PUCCH but also to an OCC applied to a PUCCH DMRS (demodulation reference signal) according to a length of a partial TTI.

In LTE system to which the present invention is applied, an OCC is applied to partial PUCCH formats (e.g., PUCCH format 1/1a/1b/3) in a time axis to perform multiplexing with a PUCCH resource of other UEs.

Figure 14:
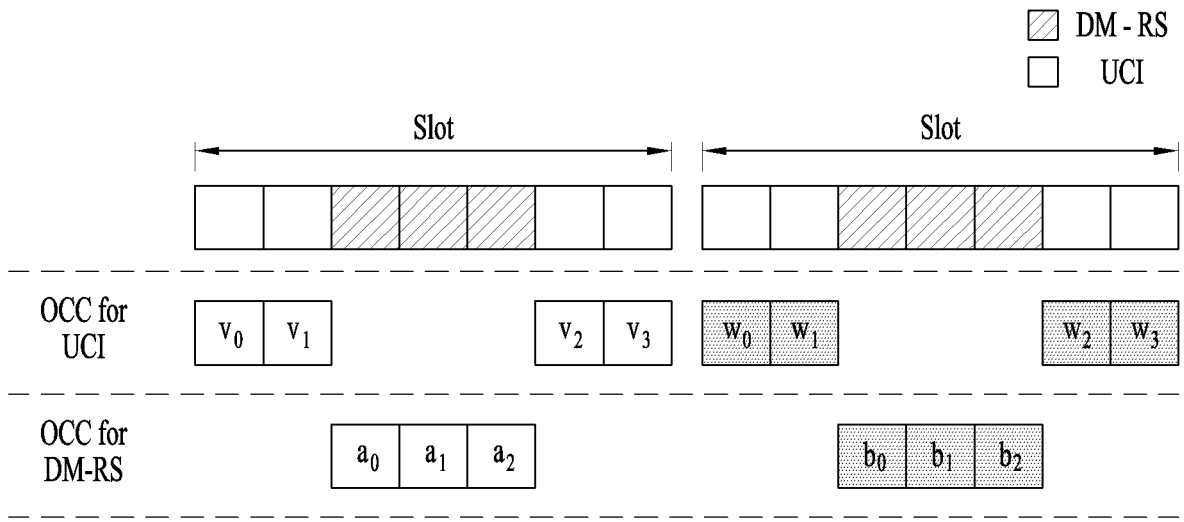
FIG. 14 is a diagram illustrating an OCC applied to each slot in case of PUCCH format 1/1a/1b.

FIG. 14 is a diagram illustrating an OCC applied to each slot in case of PUCCH format 1/1a/1b.

As shown in FIG. 14, in case of PUCCH format 1/1a/1b, a Walsh code having a length of 4 is applied to a region in which UCI is transmitted within PUCCH as an OCC in every slot. And, a DFT code having a length of 3 is applied to a PUCCH DMRS as an OCC.

If a TTI corresponds to an ending partial TTI and has a length of 11 symbols, the number of symbols of a PUCCH DMRS is reduced to 2 from 3 in a second slot and the number of symbols of a region in which UCI is transmitted is reduced to 3 from 4. The present invention proposes a method of configuring an OCC capable of being applied to a PUCCH resource according to a length of a partial TTI in advance and applying the OCC according to a length of a partial TTI when PUCCH is actually transmitted.

Figure 15:
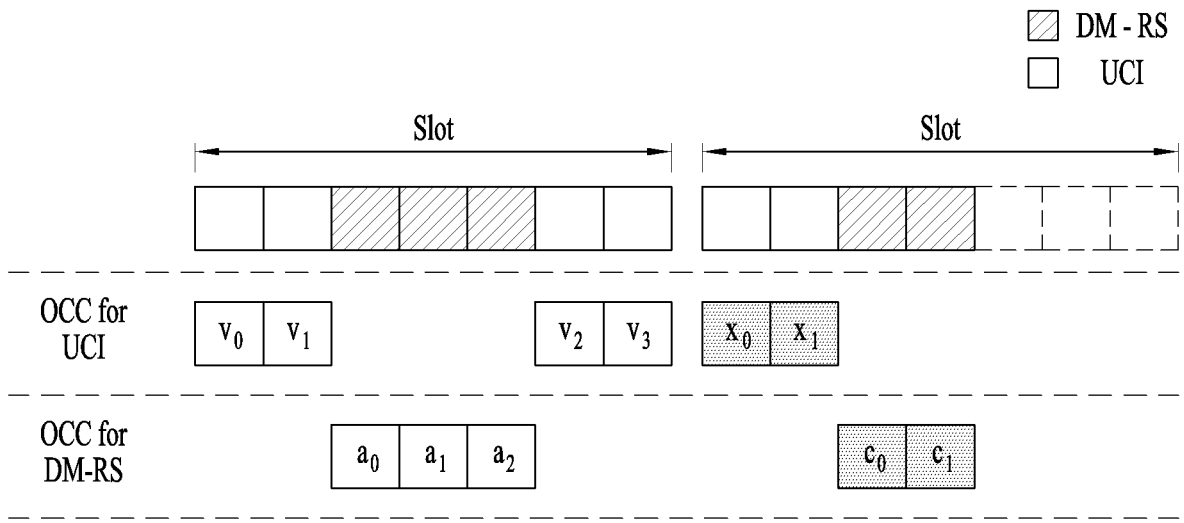
FIG. 15 is a diagram illustrating an operation of applying a different OCC according to a TTI length.

FIG. 15 is a diagram illustrating an operation of applying a different OCC according to a TTI length.

As shown in FIG. 15, when a TTI corresponds to an ending partial TTI and a length of the TTI corresponds to 11 symbols, a DFT code having a length of 2 is applied to a PUCCH DMRS and a Walsh code (or DFT code) having a length of 2 is applied to a region in which UCI is transmitted as an OCC in a second slot.

More generally, when the number of target symbols to be applied as an OCC within a partial TTI corresponds to N, the OCC can be selected from a column of a DFT matrix defined by equation 1.

$$W = \frac{1}{\sqrt{N}} \begin{bmatrix} 1 & 1 & 1 & 1 & \wedge & 1 \\ 1 & \omega & \omega^2 & \omega^3 & \wedge & \omega^{N-1} \\ 1 & \omega^2 & \omega^4 & \omega^6 & \wedge & \omega^{2(N-1)} \\ 1 & \omega^3 & \omega^6 & \omega^9 & \wedge & \omega^{3(N-1)} \\ M & M & M & M & O & M \\ 1 & \omega^{N-1} & \omega^{2(N-1)} & \omega^{3(N-1)} & \wedge & \omega^{(N-1)(N-1)} \end{bmatrix} \text{where}$$

[Equation 1]

$$\omega = e^{-i\frac{2\pi}{N}}, i = \sqrt{-1}$$

3.2.2 Method 3

When a UE transmits a shortened PUCCH format (e.g., a form that a partial symbol is excluded from a PUCCH structure) for a PUCCH format (e.g., PUCCH format 2/4/5) to which a time axis OCC is not applied in a UL subframe to which a partial TTI (or a TX gap) is applied, the UE can perform one or more operations described in the following.

(1) performs rate-matching (when a base station signals a partial TTI (or TX gap))

(2) performs rate-matching (when a base station signals a shortened PUCCH format)

(3) performs puncturing (when a base station does not signal a partial TTI (or TX gap))

Unlike the aforementioned method 2, partial PUCCH formats (e.g., PUCCH format 2/4/5) of LTE system have a structure to which a time axis OCC is not applied. Hence, if the PUCCH formats are transmitted in a partial TTI, it is not necessary to define a separate OCC. Since the PUCCH formats have a form that UCI is transmitted over the entire symbols, when a UE transmits a shortened PUCCH format, the UE can perform rate matching or puncturing on excluded symbols.

For example, if a base station indicates whether to apply a partial TTI to a specific UL subframe to a UE, the UE can perform rate-matching in consideration of the partial TTI indicated by the base station at the timing of encoding UCI to be transmitted on PUCCH.

As a different example, if the UE autonomously determines whether to apply a partial TTI to a specific subframe according to a UL LBT result, since the UE is unable to know whether or not the partial TTI is applied at the timing of encoding UCI to be transmitted on PUCCH, it is necessary for the UE to perform puncturing. In this case, when the UE performs puncturing on the PUCCH format, the UE may apply a puncturing pattern identified by a pattern (e.g., the number of detected DMRS symbols and a position at which a DMRS symbol is detected) of a PUCCH DMRS only for a BD (blind detection) operation of a base station.

As a further different example, when a UE transmits a PUCCH format to which an OCC is applied, if the UE applies a (starting) partial TTI according to a UL LBT result of the UE, the OCC is applied using an OCC length of a normal TTI (or full TTI). In this case, symbols not included in the partial TTI can be punctured (i.e., partial OCC elements are punctured).

3.2.3 Method 4

A PUCCH format in a UL subframe to which a TTI (or TX gap) is applied can be configured in a manner of being different from a PUCCH format in a UL subframe to which a normal TTI is applied. In other word, a base station can define a PUCCH format according to a TTI length for each PUCCH resource. For example, in a UL subframe to which a normal TTI is applied, a PUCCH format 1 is configured. On the other hand, in a subframe to which a partial TTI is applied, a PUCCH format 4 can be configured.

If it is able to configure a length of a partial TTI in various ways, it may be difficult to configure a shortened PUCCH format for a specific PUCCH format. For example, in case of a PUCCH format 1/1a/1b, as mentioned earlier in the method 2, it is able to configure an OCC to be applied according to a length of each partial TTI. However, it may have a demerit in that UE implementation becomes complex.

Hence, the present invention proposes a method of independently configuring a PUCCH format capable of easily configuring a relatively short PUCCH format for a UL subframe to which a partial TTI is applied.

Figure 16:
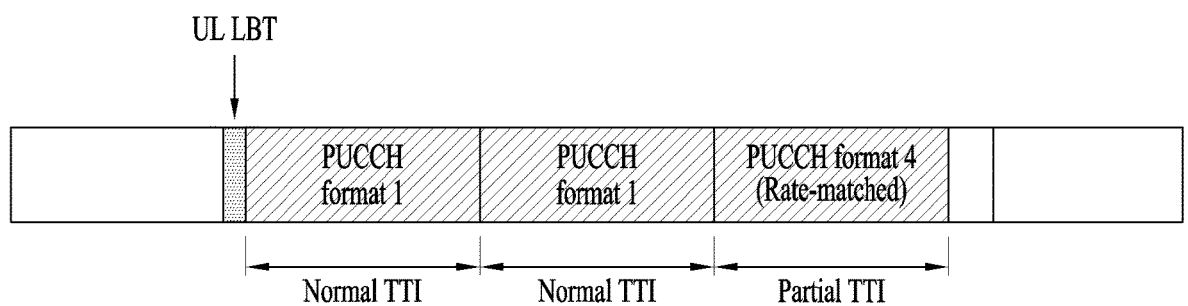
FIG. 16 is a diagram illustrating a configuration independently configuring a PUCCH format applied to a normal TTI and a partial TTI according to the present invention.

FIG. 16 is a diagram illustrating a configuration independently configuring a PUCCH format applied to a normal TTI and a partial TTI according to the present invention.

As shown in FIG. 16, a UE reports HARQ-ACK information to a base station using a PUCCH format 1 in a UL subframe to which a normal TTI is applied and can transmit HARQ-ACK information using a PUCCH format 4 (to which rate-matching or puncturing is applied) in a UL subframe to which a partial TTI is applied.

More specifically, according to the present invention, a UE can configure a PUCCH format which is applied according to a TTI length. When the UE intends to transmit UCI in a subframe, the UE can transmit the UCI using a PUCCH format, which is configured according to a TTI length, applied to the subframe.

In this case, when the UE configures a PUCCH format according to a TTI length, the UE can receive information on the PUCCH format, which is configured according to a TTI length, from the base station. In particular, the UE receive the information on the PUCCH format from the base station and may be then able to configure the PUCCH format according to a TTI length. In this case, the information can be transmitted via higher layer signaling or physical layer signaling.

In this case, if a TTI length corresponds to a first subframe corresponding to a length of a single subframe (i.e., a normal TTI or total TI), a first PUCCH format is configured. If a TTI length corresponds to a second subframe corresponding to a length shorter than a single subframe (i.e., a partial TTI or a partial subframe), a second PUCCH format is configured.

For example, according to the aforementioned method 4, the first PUCCH format corresponds to a PUCCH format 1 and the second PUCCH format may correspond to a PUCCH format 4 to which rate-matching or puncturing is applied.

Or, according to the aforementioned method 2, the first PUCCH format corresponds to a PUCCH format 1/1a/1b/3 and the second PUCCH format may correspond to a shortened PUCCH format 1/1a/1b/3 to which an OCC (orthogonal cover code) corresponding to a TTI length is applied.

Or, according to the aforementioned method 3, the first PUCCH format corresponds to a PUCCH format 2/4/5 and the second PUCCH format may correspond to a PUCCH format 2/4/5 to which rate-matching or puncturing is applied.

The uplink control information can be transmitted via an unlicensed band using the configuration above.

3.2.4 Method 5

A base station can configure whether or not a shortened PUCCH format is configured/applied via higher layer signaling (e.g., RRC signaling)

If a base station does not dynamically inform a UE of whether or not a partial TTI is applied to a subframe in which PUCCH is transmitted in consideration of control signaling overhead, in order for the UE to support PUCCH transmission in a partial TTI, the UE should transmit PUCCH information using a short PUCCH format by assuming a plurality of TTIs (e.g., a poorest partial TTI, etc.). In order to support the abovementioned UE operation, the base station can inform the UE of information on whether or not a shortened PUCCH format to be applied to the UE is configured/applied in advance via higher layer signaling (e.g., RRC signaling).

Figure 17:
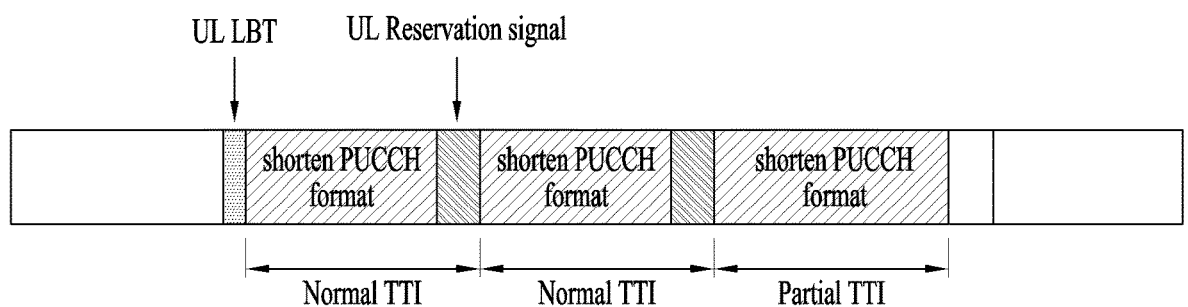
FIG. 17 is a diagram illustrating an operation of a UE always performing transmission with a shortened PUCCH format.

FIG. 17 is a diagram illustrating an operation of a UE always performing transmission with a shortened PUCCH format.

As shown in FIG. 17, although a UE performs transmission using a shortened PUCCH format, the UE can transmit a signal in a form of a normal TTI within a UL TX burst. To this end, if UL data does not exist at a dropped symbol position in the shortened PUCCH format, the UE can transmit a UL reservation signal in a manner of filling the UL reservation signal in the position.

3.2.5 Method 6

If PUCCH transmission is indicated in a UL subframe to which a partial TTI (or TX gap) is applied, a UE may drop the PUCCH transmission (unless a shortened PUCCH format is configured).

When a separate shortened PUCCH format is not configured, if a UL subframe in which PUCCH is to be transmitted by a UE corresponds to a partial TTI, the UE has no choice but to drop the PUCCH transmission in the UL subframe. In particular, the UE can perform the PUCCH transmission by putting a priority on the indication on the partial TTI rather than the indication on the PUCCH transmission.

3.3 UCI Piggyback Method Considering Partial TTI

3.3.1 Method 7

When a UE performs UCI piggyback via PUSCH in a UL subframe to which a partial TTI (or TX gap) is applied, resource mapping for a coded symbol of UCI (e.g., HARQ-ACK, RI (rank indicator), or CQI (channel quality indicator)) can be defined according to a partial TTI length.

When a base station indicates information on whether or not a partial TTI is applied in a specific UL subframe to a UE, the UE can define resource mapping for a coded symbol by utilizing the information on the partial TTI in order not to loss UCI information in a partial TTI structure. In particular, in case of HARQ-ACK or RI, symbols for mapping a UCI resource can be differently defined according to a partial TTI length. In this case, HARQ-ACK transmission or RI transmission can be dropped for a specific partial TTI length. In the following, each of examples is explained in detail with reference to the example of the method 7 of the present invention.

(1) If a partial TTI length is shorter than 7 symbols,

A UE does not perform UCI piggyback on one symbol for HARQ-ACK or RI in a corresponding UL subframe.

Or, the UE transmits HARQ-ACK or RI as much as possible by defining UCI resource mapping according to a partial TTI length.

Figure 18:
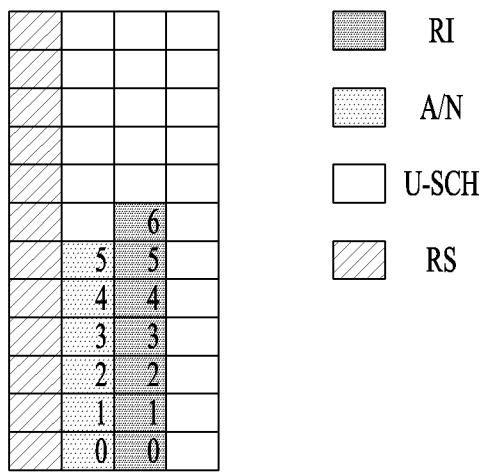
FIG. 18 is a diagram illustrating a UCI mapping pattern when a length of a starting partial TTI is shorter than 7 symbols and FIG. 19 is a diagram illustrating a UCI mapping pattern when a length of an ending partial TTI is shorter than 7 symbols.
Figure 19:
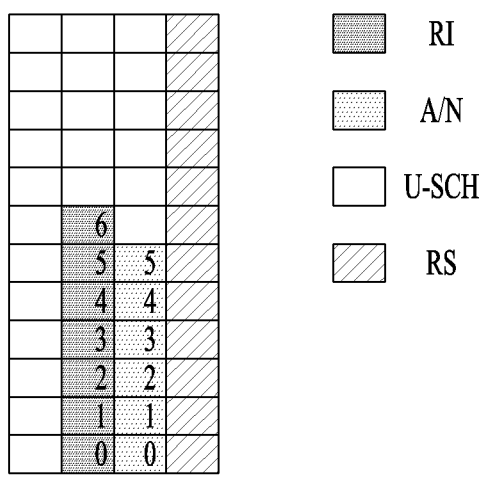

FIG. 18 is a diagram illustrating a UCI mapping pattern when a length of a starting partial TTI is shorter than 7 symbols and FIG. 19 is a diagram illustrating a UCI mapping pattern when a length of an ending partial TTI is shorter than 7 symbols.

As shown in FIG. 18 or FIG. 19, UCI mapping can be differently applied according to whether a specific TTI corresponds to a starting partial TTI or an ending partial TTI. In other word, a UE can transmit HARQ-ACK or RI in a form and a mapping order shown in FIG. 18 or FIG. 19 according to whether a specific TTI corresponds to a starting partial TTI or an ending partial TTI. In FIGS. 18 and 19, a horizontal axis and a vertical axis correspond to a time axis and a frequency axis, respectively. One box corresponds to a resource element and a number corresponds to a mapping order.

Figure 20:
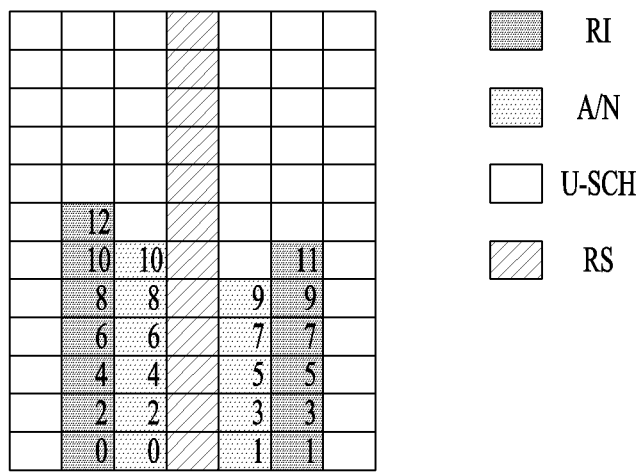
FIG. 20 is a diagram illustrating a UCI mapping pattern when a length of a partial TTI is equal to or longer than 7 symbols and is shorter than 11 symbols.

(2) If a partial TTI length is equal to or longer than 7 symbols and is shorter than 11 symbols, FIG. 20 is a diagram illustrating a UCI mapping pattern when a length of a partial TTI is equal to or longer than 7 symbols and is shorter than 11 symbols.

If a partial TTI length is equal to or longer than 7 symbols and is shorter than 11 symbols, a UE can transmit HARQ-ACK or RI in a form and a mapping order shown in FIG. 20. Similar to FIGS. 18 and 19, in FIG. 20, a horizontal axis and a vertical axis correspond to a time axis and a frequency axis, respectively. One box corresponds to a resource element and a number corresponds to a mapping order.

Figure 21:
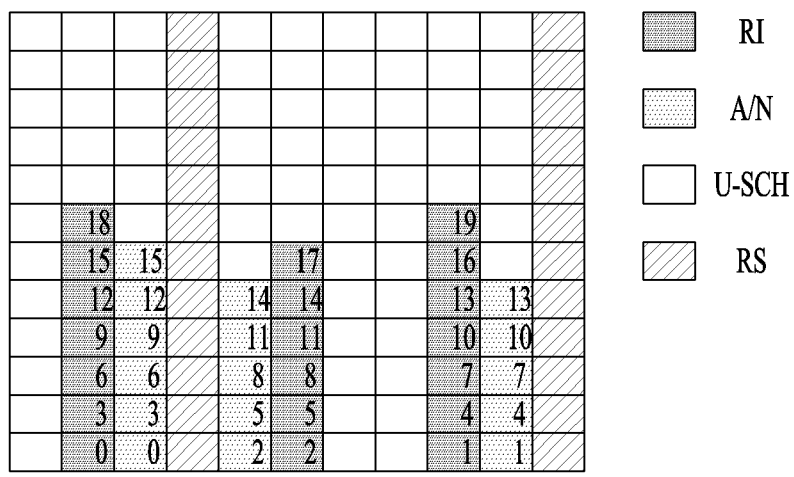
FIG. 21 is a diagram illustrating a UCI mapping pattern when a length of an ending partial TTI is equal to or longer than 11 symbols and is shorter than 14 symbols.

(3) If a TTI corresponds to a partial TTI and a TTI length is equal to or longer than 11 symbols and is shorter than 14 symbols, FIG. 21 is a diagram illustrating a UCI mapping pattern when a length of an ending partial TTI is equal to or longer than 11 symbols and is shorter than 14 symbols.

If a specific TTI corresponds to an ending partial TTI, a UE can transmit HARQ-ACK and RI in a form and a mapping order shown in FIG. 21. In this case, a horizontal axis and a vertical axis correspond to a time axis and a frequency axis, respectively. One box corresponds to a resource element and a number corresponds to a mapping order. For clarity, FIG. 21 illustrates a mapping pattern that the last 3 symbols are omitted in a normal TTI.

Figure 22:
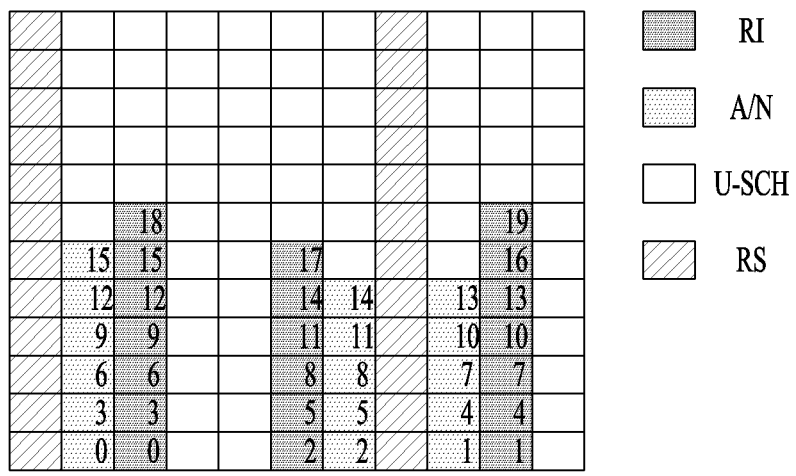
FIG. 22 is a diagram illustrating a resource mapping pattern of a coded symbol for CQI/PMI when a length of an ending partial TTI is equal to or longer than 11 symbols and is shorter than 14 symbols.

FIG. 22 is a diagram illustrating a UCI mapping pattern when a length of an ending partial TTI is equal to or longer than 11 symbols and is shorter than 14 symbols.

If a specific TTI corresponds to an ending partial TTI, a UE can transmit HARQ-ACK and RI in a form and a mapping order shown in FIG. 22. In this case, a horizontal axis and a vertical axis correspond to a time axis and a frequency axis, respectively. One box corresponds to a resource element and a number corresponds to a mapping order. For clarity, FIG. 21 illustrates a mapping pattern that the first 3 symbols are omitted in a normal TTI.

The aforementioned method 7 can be applied to a case of performing resource mapping of a coded symbol on CQI/PMI (precoding matrix indicator) as well. For example, in case of the CQI/PMI, resource mapping is performed in an ascending order of a time axis index in a direction of a time axis from the point at which a frequency axis index is highest (e.g., time first scheme). In this case, a start point and an end point of the time axis can be configured by a start point and an end point of a partial TTI.

Figure 23:
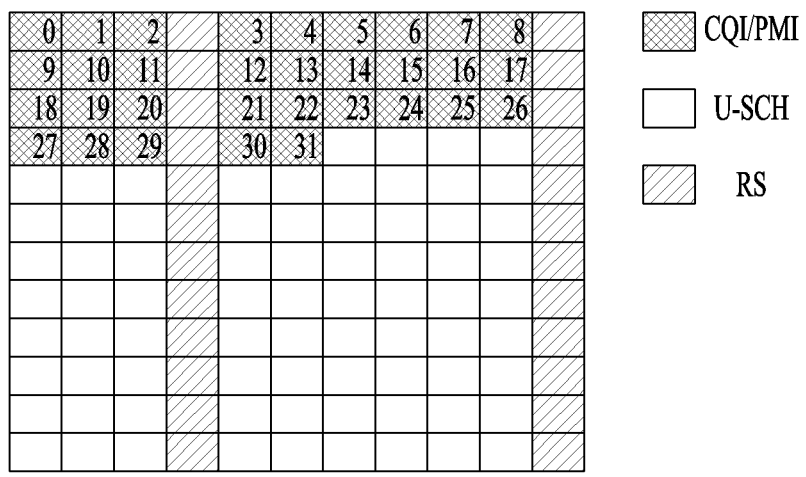
FIG. 23 is a diagram illustrating a resource mapping pattern of a coded symbol for CQI/PMI when a length of an ending partial TTI corresponds to 11 symbols.

FIG. 23 is a diagram illustrating a resource mapping pattern of a coded symbol for CQI/PMI when a length of an ending partial TTI corresponds to 11 symbols.

3.3.2 Method 8

When a UE performs UCI piggyback with PUSCH in a UL subframe to which a partial TTI (or TX gap) is applied, resource mapping for a coded symbol of UCI (e.g., HARQ-ACK, RI, or CQI/PMI) is defined in a slot unit and the resource mapping pattern is repeated two times in one subframe to perform UCI mapping.

The aforementioned method 7 can be applied when a UE is able to know information on whether or not a partial TTI is applied and information on a length of the partial TTI. On the contrary, if a UE applies a partial TTI according to a UL LBT result, it is unable to apply the method 7. In particular, the UE defines UCI resource mapping in PUSCH on the basis of a single slot and can transmit the same information by repeatedly mapping the information to two slots in a subframe.

Figure 24:
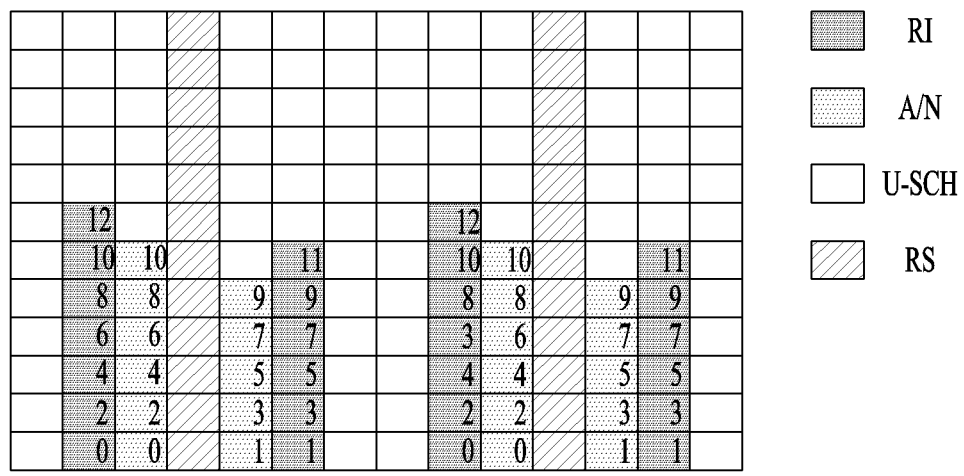
FIG. 24 is a diagram illustrating a UCI mapping pattern according to a method 8 of the present invention.

FIG. 24 is a diagram illustrating a UCI mapping pattern according to a method 8 of the present invention.

As shown in FIG. 24, HARQ-ACK and TI information can be transmitted in a manner of being repeatedly mapped to each slot in a subframe.

According to the configuration above, if a length of a partial TTI is equal to or longer than 7 symbols, it may be able to have a merit in that UCI information can be intactly forwarded irrespective of whether or not a UE applies a starting partial TTI or an ending partial TTI to a specific TTI.

As a variation of the method 8, a UE can perform UCI resource mapping in a manner of mapping UCI information to a fore slot (or rear slot) first. More specifically, the UE transmits UCI in symbols available in the fore slot (or rear slot) and can transmit the remaining UCI in a rear slot (or fore slot).

3.3.3 Method 9

When a UE performs UCI piggyback with PUSCH, (if HARQ-ACK transmission is not configured) the UE can perform resource mapping for a coded symbol of CSI in a symbol adjacent to a PUSCH DMRS.

Figure 25:
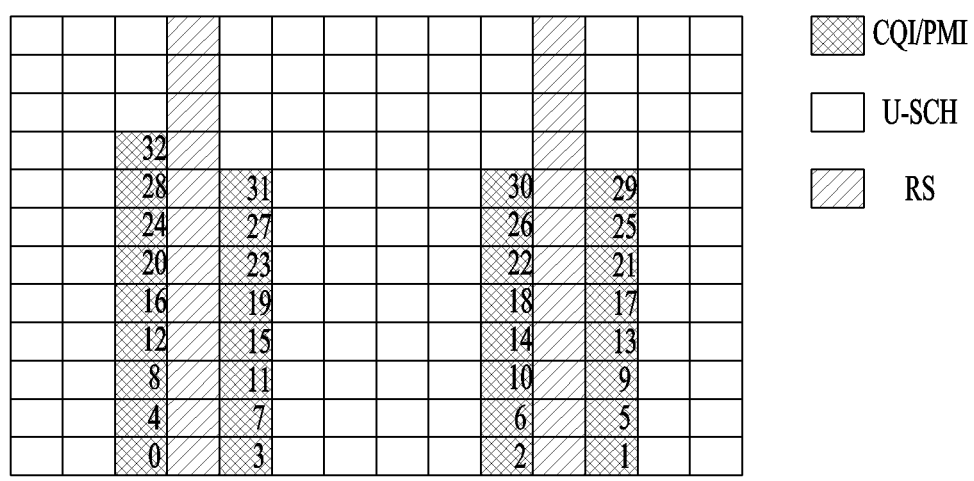
FIG. 25 is a diagram illustrating a UCI mapping pattern according to a method 9 of the present invention.

FIG. 25 is a diagram illustrating a UCI mapping pattern according to a method 9 of the present invention.

Since HARQ-ACK among UCI is more important than CSI, a base station may prefer to transmit the HARQ-ACK via a licensed band or a cell (L-cell) of the licensed band rather than an unlicensed band or a cell (U-cell) of the unlicensed band having a low transmission probability. In particular, the base station may consider that the CSI is transmitted in a manner of being piggybacked on PUSCH only which is transmitted via a cell (U-cell) of an unlicensed band.

As mentioned in the foregoing description, if HARQ-ACK is configured not to be transmitted in a cell (U-cell) of an unlicensed band, it is preferable for a UE to transmit CSI in a symbol adjacent to a PUSCH DMRS symbol. For example, as shown in FIG. 25, it may be able to allocate a coded symbol for CSI.

3.3.4 Method 10

A UE can be configured not to perform UCI piggyback with PUSCH in a UL subframe to which a partial TTI (or TX gap) is applied.

If such important UCI as HARQ-ACK and the like are not transmitted in a cell (U-cell) of an unlicensed band, although a UE drops UCI transmission in a partial TTI, a significant performance problem may not occur. Hence, as mentioned in the foregoing description, if UCI piggyback is not performed in a partial TTI, since the UE does not perform UCI transmission in the partial TTI, it is able to simply implement the UE.

As a variation of the method 10, it may be able to drop piggyback of the specific UCI (e.g., HARQ-ACK or RI) only when at least one of symbols, which are available for performing UCI resource mapping in a normal TTI (or full TTI), is not transmitted due to a partial TTI. UL data can be transmitted in a position at which UCI transmission is dropped.

3.3.5 Method 11

When a UE performs UCI piggyback with PUSCH in a UL subframe to which a partial TTI (or TX gap) is applied, the UE may apply a separate beta offset value.

When the UE transmits UCI by piggybacking the UCI with a PUSCH resource and a base station calculates the number of coded symbols for transmitting the UCI within the PUSCH by reflecting a design parameter beta configured via higher layer signaling, the base station can independently set the beta value to the UE according to a length of the partial TTI. For example, the UE may increase the number of coded symbols by setting a high beta offset value to help the base station determine DTX (discontinuous transmission) to identify whether or not the base station transmit UCI in a partial TTI.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/ aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 26:
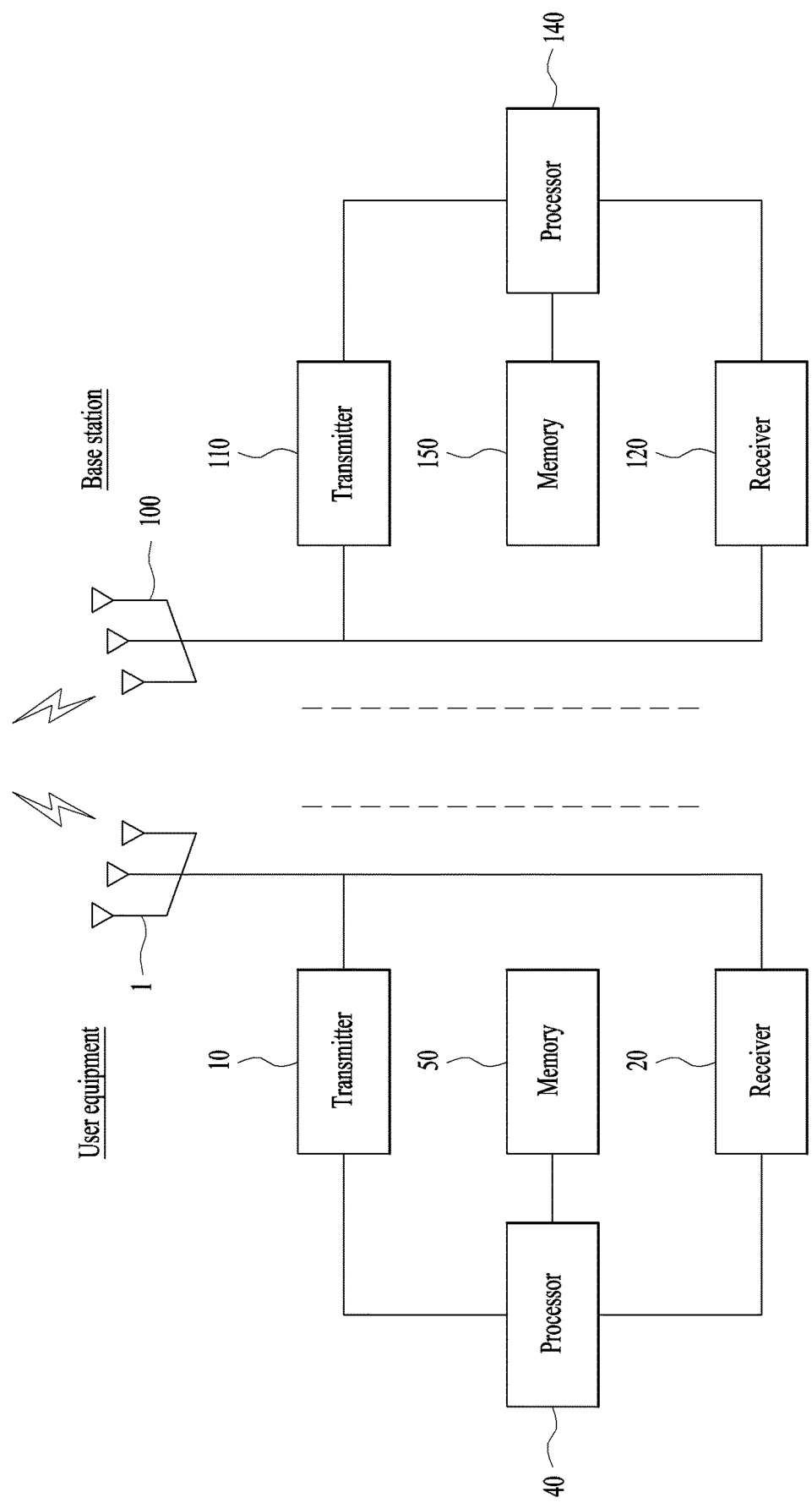
FIG. 26 is a diagram illustrating configurations of a UE and a base station in which proposed embodiments are implementable.

FIG. 26 is a diagram illustrating configurations of a UE and a base station capable of being implemented by the embodiments proposed in the present invention. The UE and the base station shown in FIG. 26 operate to implement the embodiments of a method of transmitting and receiving uplink control information between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE receives first DL control information indicating whether a type of scheduling uplink signal transmission for one or more subframes corresponds to scheduling of a first type or scheduling of a second type from the base station via the processor 40. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 140. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 26 may further include a low-power Radio Frequency (RF)/ Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 180 or 190 and executed by the processor 120 or 130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of transmitting uplink control information, which is transmitted by a user equipment (UE) to a base station in a wireless communication system supporting an unlicensed band, the method comprising:
configuring a physical uplink control channel (PUCCH) format which is applied according to a transmission time interval (TTI) length by the base station; and
transmitting the uplink control information in a subframe in which the uplink control information is to be transmitted using a PUCCH format which is configured according to a TTI length applied to the subframe.

2. The method of claim 1, wherein the configuring the PUCCH format which is applied according to the TTI length by the base station corresponds to receiving information on the PUCCH format which is applied according to the TTI length from the base station.

3. The method of claim 1, wherein a first PUCCH format is configured to a first subframe of which a TTI length corresponds to a length of one subframe, and
wherein a second PUCCH format is configured to a second subframe of which a TTI length is shorter than a length of one subframe.

4. The method of claim 3, wherein the first PUCCH format corresponds to a PUCCH format 1, and
wherein the second PUCCH format corresponds to a PUCCH format 4 to which rate-matching or puncturing is applied.

5. The method of claim 3, wherein the first PUCCH format corresponds to a PUCCH format 1/1a/1b/3, and
wherein the second PUCCH format corresponds to a shortened PUCCH format 1/1a/1b/3 to which an OCC (orthogonal cover code) corresponding to a TTI length is applied.

6. The method of claim 3, wherein the first PUCCH format corresponds to a PUCCH format 2/4/5, and
wherein the second PUCCH format corresponds to a PUCCH format 2/4/5 to which rate-matching or puncturing is applied.

7. The method of claim 1, wherein the uplink control information comprises at least one of acknowledgement/non-Acknowledgement (ACK/NACK) information, rank indicator (RI) information, and channel quality indicator (CQI) information.

8. The method of claim 1, wherein the uplink control information is transmitted via the unlicensed band.

9. A method of receiving uplink control information, which is received by a base station from a user equipment (UE) in a wireless communication system supporting an unlicensed band, the method comprising:
configuring a physical uplink control channel (PUCCH) format, which is applied according to a transmission time interval (TTI) length, to the UE; and
receiving the uplink control information from the UE in one or more subframes using a PUCCH format which is configured according to a TTI length applied to the one or more subframes.

10. A user equipment (UE) for transmitting uplink control information to a base station in a wireless communication system supporting an unlicensed band, the UE comprising:
a receiver;
a transmitter; and
a processor configured to operate in a manner of being connected with the receiver and the transmitter,
wherein the processor is configured to:
configure a physical uplink control channel (PUCCH) format which is applied according to a transmission time interval (TTI) length by the base station, and
transmit the uplink control information in a subframe in which the uplink control information is to be transmitted using a PUCCH format which is configured according to a TTI length applied to the subframe.

11. A base station for receiving uplink control information from a user equipment (UE) in a wireless communication system supporting an unlicensed band, the base station comprising:
   a receiver;
   a transmitter; and
   a processor configured to operate in a manner of being connected with the receiver and the transmitter,
   wherein the processor is configured to:
   configure a physical uplink control channel (PUCCH) format, which is applied according to a transmission time interval (TTI) length, to the UE, and
   receive the uplink control information from the UE in one or more subframes using a PUCCH format which is configured according to a TTI length applied to the one or more subframes.

\* \* \* \* \*